(12) United States Patent
Guggilla et al.

(10) Patent No.: US 10,303,689 B2
(45) Date of Patent: *May 28, 2019

(54) ANSWERING NATURAL LANGUAGE TABLE QUERIES THROUGH SEMANTIC TABLE REPRESENTATION

(71) Applicant: International Business Machines Corporation, Armonk, NY (US)

(72) Inventors: Chinnappa Guggilla, Bangalore (IN); Prabhakar R. Majjiga, Hyderabad (IN); Praveen K. Midde, Hyderabad (IN); Avinesh Polisetty Venkata Sai, Kakinada (IN)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/193,528

(22) Filed: Jun. 27, 2016

(65) Prior Publication Data

US 2016/0306852 A1 Oct. 20, 2016

Related U.S. Application Data

(63) Continuation of application No. 14/644,302, filed on Mar. 11, 2015.

(51) Int. Cl.
*G06F 17/30* (2006.01)
*G06F 16/2455* (2019.01)
*G06F 16/22* (2019.01)
*G06F 16/2457* (2019.01)

(52) U.S. Cl.
CPC ...... *G06F 16/2455* (2019.01); *G06F 16/2246* (2019.01); *G06F 16/24578* (2019.01)

(58) Field of Classification Search
CPC ......... G06F 17/30958; G06F 17/30327; G06F 17/30339; G06F 17/30654
See application file for complete search history.

(56) References Cited

U.S. PATENT DOCUMENTS

| | | |
|---|---|---|
| 7,146,356 B2 | 12/2006 | Choi et al. |
| 7,542,962 B2 | 6/2009 | Finlay et al. |
| 7,849,049 B2 | 12/2010 | Langseth et al. |
| 8,140,546 B2 | 3/2012 | Yoshida |
| 8,260,817 B2 | 9/2012 | Boschee et al. |

(Continued)

OTHER PUBLICATIONS

IBM, "List of IBM Patents or Patent Applications Treated as Related (Appendix P)," Aug. 1, 2016, p. 1-2.

(Continued)

*Primary Examiner* — Usmaan Saeed
*Assistant Examiner* — William P Bartlett
(74) *Attorney, Agent, or Firm* — Robert C. Bunker

(57) ABSTRACT

According to one exemplary embodiment, a method for finding an answer to a query from a table is provided. The method may include receiving the query and the table. The method may also include generating a hierarchical representation based on the received table, whereby the hierarchical representation comprises a primary tree and a secondary tree. The method may then include mapping the primary tree to the secondary tree. The method may further include generating a plurality of predicate triples in a semantic relationship form based on the primary tree and the secondary tree. The method may also include determining if a predicate triple within the plurality of predicate triples matches the query using query-side and table-side context and semantics. The method may then include adding the predicate triple within the plurality of predicate triples to a plurality of candidate answers based on determining that the predicate triple matches the query.

7 Claims, 8 Drawing Sheets

(56) References Cited

U.S. PATENT DOCUMENTS

| | | |
|---|---|---|
| 8,655,923 B2 | 2/2014 | Zurek et al. |
| 8,738,617 B2 | 5/2014 | Brown et al. |
| 8,762,131 B1 | 6/2014 | Diaconescu et al. |
| 2002/0067360 A1 | 6/2002 | Chi et al. |
| 2003/0097384 A1 | 5/2003 | Hu et al. |
| 2006/0242180 A1 | 10/2006 | Graf et al. |
| 2009/0182766 A1 | 7/2009 | Draese |
| 2009/0187815 A1 | 7/2009 | Becerra, Sr. et al. |
| 2010/0114902 A1 | 5/2010 | Embley et al. |
| 2011/0125734 A1 | 5/2011 | Duboue et al. |
| 2011/0307477 A1 | 12/2011 | Dasari et al. |
| 2012/0011115 A1 | 1/2012 | Madhavan et al. |
| 2013/0238621 A1 | 9/2013 | Ganjam et al. |
| 2013/0346445 A1 | 12/2013 | Mizell et al. |
| 2014/0122535 A1 | 5/2014 | Gerard et al. |
| 2015/0331845 A1 | 11/2015 | Guggilla et al. |
| 2016/0132572 A1 | 5/2016 | Chang et al. |
| 2016/0267117 A1 | 9/2016 | Guggilla et al. |

OTHER PUBLICATIONS

Guggilla et al., "Answering Natural Language Table Queries Through Semantic Table Representation," Application and Drawings, Filed on Mar. 11, 2015, 41 Pages, U.S. Appl. No. 14/644,302.

Guggilla et al., "Table Narration Using Narration Templates," Filed on May 13, 2014, p. 1-50, U.S. Appl. No. 14/275,993.

Lally et al., "Question analysis: How Watson reads a clue," IBM Journal of Research and Development, May/Jul. 2012, p. 2:1-2:14, vol. 56, No. 3/4, International Business Machines Corporation.

Mell et al., "The NIST Definition of Cloud Computing," National Institute of Standards and Technology, Information Technology Laboratory, Oct. 7, 2009, Version 15.

Mulwad et al., "A Domain Independent Framework for Extracting Linked Semantic Data from Tables," Search Computing III: Broadening Web Search, 2012, p. 16-33, Lecture Notes in Computer Science vol. 7538, Springer-Verlag.

Pimplikar et al., "Answering Table Queries on the Web using Column Keywords," Proceedings of the VLDB Endowment, 2012, p. 908-919, vol. 5, No. 10.

Pinto et al., "Table Extraction Using Conditional Random Fields," SIGIR'03, Jul. 28-Aug. 1, 2003, p. 235-242, ACM, Toronto, Canada.

Wei et al., "Question Answering Performance on Table Data," Proceedings of the 2004 Annual National Conference on Digital Government Research, May 24-26, 2004, dg.o '04, Digital Government Society of North America, Seattle, WA.

Shekarpour et al., "Question Answering on Interlinked Data," Proceedings of the 22nd International Conference on World Wide Web (WWW 2013), May 13-17, 2013, p. 1145-1155, ACM, Rio de Janeiro, Brazil.

ANSWERING NATURAL LANGUAGE TABLE QUERIES THROUGH SEMANTIC TABLE REPRESENTATION

BACKGROUND

The present invention relates generally to the field of computing, and more particularly to answering natural language queries from semi-structured data sources.

Tables (i.e., tabular data) are generally embodied in large collections of textual documents. The information contained within tables is arranged into rows and columns in a semi-structured format that naturally encodes certain relationships between rows and columns of data. Tables are specifically designed as semi-structured databases for human consumption in contrast to relational databases that may be more easily read by an electronic device, such as a computer.

SUMMARY

According to one exemplary embodiment, a method for finding an answer to a query from a table is provided. The method may include receiving the query and the table. The method may also include generating a hierarchical representation based on the received table, whereby the hierarchical representation comprises a primary tree and a secondary tree. The method may then include mapping the primary tree to the secondary tree. The method may further include generating a plurality of predicate triples based on the primary tree and the secondary tree. The method may also include determining if a predicate triple within the plurality of predicate triples matches the query. The method may then include adding the predicate triple within the plurality of predicate triples to a plurality of candidate answers based on determining that the predicate triple matches the query. A second method may include matching natural language queries with the primary tree and secondary tree directly to generate an answer.

According to another exemplary embodiment, a computer system for finding an answer to a query from a table is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the query and the table. The method may also include generating a hierarchical representation based on the received table, whereby the hierarchical representation comprises a primary tree and a secondary tree. The method may then include mapping the primary tree to the secondary tree. The method may further include generating a plurality of predicate triples based on the primary tree and the secondary tree. The method may also include determining if a predicate triple within the plurality of predicate triples matches the query. The method may then include adding the predicate triple within the plurality of predicate triples to a plurality of candidate answers based on determining that the predicate triple matches the query. A second method may include matching natural language queries with the primary tree and secondary tree directly to generate an answer.

According to yet another exemplary embodiment, a computer program product for finding an answer to a query from a table is provided. The computer program product may include one or more computer-readable storage devices and program instructions stored on at least one of the one or more tangible storage devices, the program instructions executable by a processor. The computer program product may include program instructions to receive the query and the table. The computer program product may also include program instructions to generate a hierarchical representation based on the received table, whereby the hierarchical representation comprises a primary tree and a secondary tree. The computer program product may then include program instructions to map the primary tree to the secondary tree. The computer program product may further include program instructions to generate a plurality of predicate triples based on the primary tree and the secondary tree. The computer program product may also include program instructions to determine if a predicate triple within the plurality of predicate triples matches the query. The computer program product may then include program instructions to add the predicate triple within the plurality of predicate triples to a plurality of candidate answers based on determining that the predicate triple matches the query. A second method may include program instructions to match natural language queries with the primary tree and secondary tree directly to generate an answer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
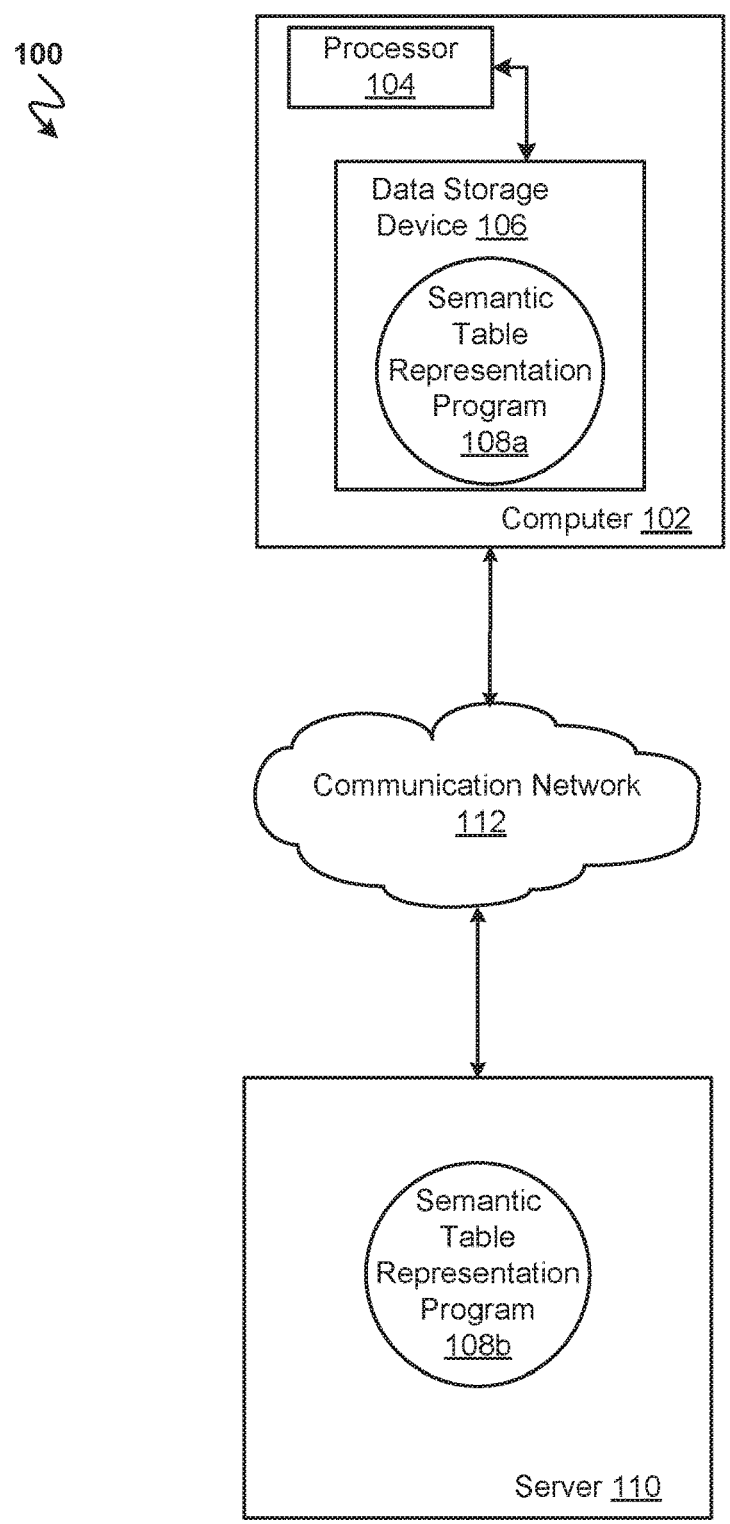
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for answering natural language table queries through semantic table representation. Additionally, the present embodiment has the capacity to improve the technical field of answering natural language queries by representing semantic table relationships with tree structures.

As previously described, tables embedded within textual documents (e.g., web sites, HyperText Markup Language (HTML), Portable Document Format (PDF) files, etc.) contain information formatted for interpretation by humans. The relationships between rows and columns in a semi-structured table may be simple for a human to discern. However, procedurally mining important information from tables to capture data in a way that preserves the relationships between rows and columns within the table for use in question answering and information retrieval may be difficult. In particular, organizing data from semi-structured tables for use in responding to natural language queries may be a computationally expensive operation and may not be flexible enough to deal with complex tables (i.e., tables with subheadings), partially extracted tables, or noisy tables (e.g., formatting data for the table that inadvertently was introduced along with the table data during the data extraction process). Furthermore, data extraction from semi-structured tables may fail to capture the relationship between table cells and headers, thereby resulting in ineffective answers to natural language queries.

Therefore, it may be advantageous to, among other things, provide a generalized way to efficiently transform a semi-structured table into a representation that captures and makes use of the table's structure and semantics for accurately answering natural language queries.

According to at least one embodiment, extracted tables may form a document corpus, whereby the tables are detected and extracted accurately or nearly accurately. The tables may be classified using a predefined set categories or patterns based on the table structure and layout. Tables may contain information such as numerical, textual and a combination of textual and numerical data. The present embodiment may receive a natural language query that has an identified focus and lexical answer type (LAT) (i.e., salient terms within a natural language query). The focus may indicate a keyword or phrase signaling intent within the natural language query. The LAT may specify the named entity type of the focus. For example, for the natural language query "Who is the CEO of the company?" the focus may be CEO and the corresponding LAT may be the Job Role/Person Types.

The first column of a table (with or without a header) may be identified as the primary information of the table and the remaining columns may be categorized as secondary information. The present embodiment may search for matches between the focus/LAT and the column headers or sub-headers of the table. Meaningful information from the table may be retrieved in cases when the primary information is projected on to the secondary information. Primary information and secondary information matched with appropriate semantic relationships (e.g., IsA, HasA, PartOf, CategoryOf, etc.) may produce a meaningful query answer. First column values from the table may have a semantic relationship with the remaining columns in the table. This pattern may be consistent across simple row-header tables, row-header and column-header tables, sub-header tables, section-header tables, etc. Thus, the table structure may be effectively represented using a hierarchical tree data structure that may preserve the order and structure of elements from the table.

According to at least one embodiment, the semantic table representation process may begin by transforming extracted table data from a source document into a corresponding intermediate structured tree form based on the table pattern type. The tree structure may generalize different categories of tables into a consistent, single structure, whereby tables may be represented in a compact format. The data corresponding to the first column of a table may used to populate a pivot tree (i.e., primary tree) whereby the header becomes the root node and all cell values contained within the first column become child nodes of the pivot tree. Then, an association tree (i.e., secondary tree) may be constructed and populated with the remaining columns of the table, having the header as the root node and the cell values as child nodes. For example, if there are N columns in the input table, N−1 association trees would be constructed and all N−1 association trees would have the header as the root node. The pivot and association trees may be built using a depth first search (DFS) tree traversal order. Category headers and sub-headers may become intermediate nodes of the tree if present in the input table. Footer or summary information (e.g., text from source document surrounding the table) associated with the input table may be used to build and populate a separate summary tree structure.

Then, the semantic table representation process may map each child node of the pivot tree with the corresponding child node of the association tree in left-to-right breadth first search (BFS) tree traversal order, such that the relationship between headers and corresponding cell values may be maintained over multiple tree structures. Values corresponding to the child nodes of the pivot tree and/or root nodes/intermediate nodes of the association tree may be used as the predicate arguments in a predicate triple structure (i.e., two predicate arguments and a value element). Information may be stored in a predicate argument triple structure to more closely resemble a natural language answer. The values of the child nodes in the association tree corresponding to the predicate arguments may be used to populate the value element in the predicate triple. The semantic table representation process may then construct all possible combinations of predicate triples from the pivot and association trees and store them in a data repository, such as a database, to form a knowledge base (i.e., table predicate argument structure (TPAS)). From table content (e.g., dates, organization, location names, etc.) corresponding semantic relationships (e.g., IsA, HasA, PartOf, etc.) between pivot and association trees may also be identified and used to augment the TPAS as semantic features.

Table specific content (e.g., title, text description of the table, etc.) may also be extracted from the original document that contained the input table (e.g., PDF document) and processed. Each sentence may be parsed, matched to corresponding predicate arguments of the pivot or association tree and be stored in a data repository (i.e., as a table context predicate argument structure (TCPAS)). This information may later be used as a substitute for information missing from the table.

According to at least one embodiment, the natural language query supplied to the semantic table representation process may have already been analyzed and parsed to identify the predicate arguments. Additionally, the focus/LAT may be provided to the semantic table representation process as input. The natural language query focus, predicates, and semantic relationships may then be matched with table and context arguments as well as semantic relationships using a known string similarity measure. The resulting values generated by the string similarity measure may be used to rank candidate answers and store in a candidate answer unit knowledge base as a tuple (e.g., answer string, string similarity score). For partial predicate matches found in the TPAS, missing predicate information may be search for in the TCPAS to construct complete predicate arguments.

Referring now to FIG. 1, an exemplary networked computer environment 100 in accordance with one embodiment is depicted. The networked computer environment 100 may include a computer 102 with a processor 104 and a data storage device 106 that is enabled to run a semantic table representation program 108a. The networked computer environment 100 may also include a server 110 that is enabled to run a semantic table representation program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 6, server computer 110 may include internal components 602a and external components 604a, respectively and client computer 102 may include internal components 602b and external components 604b, respectively. Client computer 102 may be, for example, a mobile device, a telephone, a PDA, a netbook, a laptop computer, a tablet computer, a desktop computer, or any type of computing device capable of running a program and accessing a network.

A program, such as a semantic table representation program 108a and 108b may run on the client computer 102 or on the server computer 110. The semantic table representation program 108a and 108b may be used to decompose semi-structured tables into pivot and association trees to preserve semantic relationships for accurately answering natural language queries. The semantic table representation program 108a and 108b is explained in further detail below with respect to FIGS. 2, 3, 4, and 5.

Figure 2:
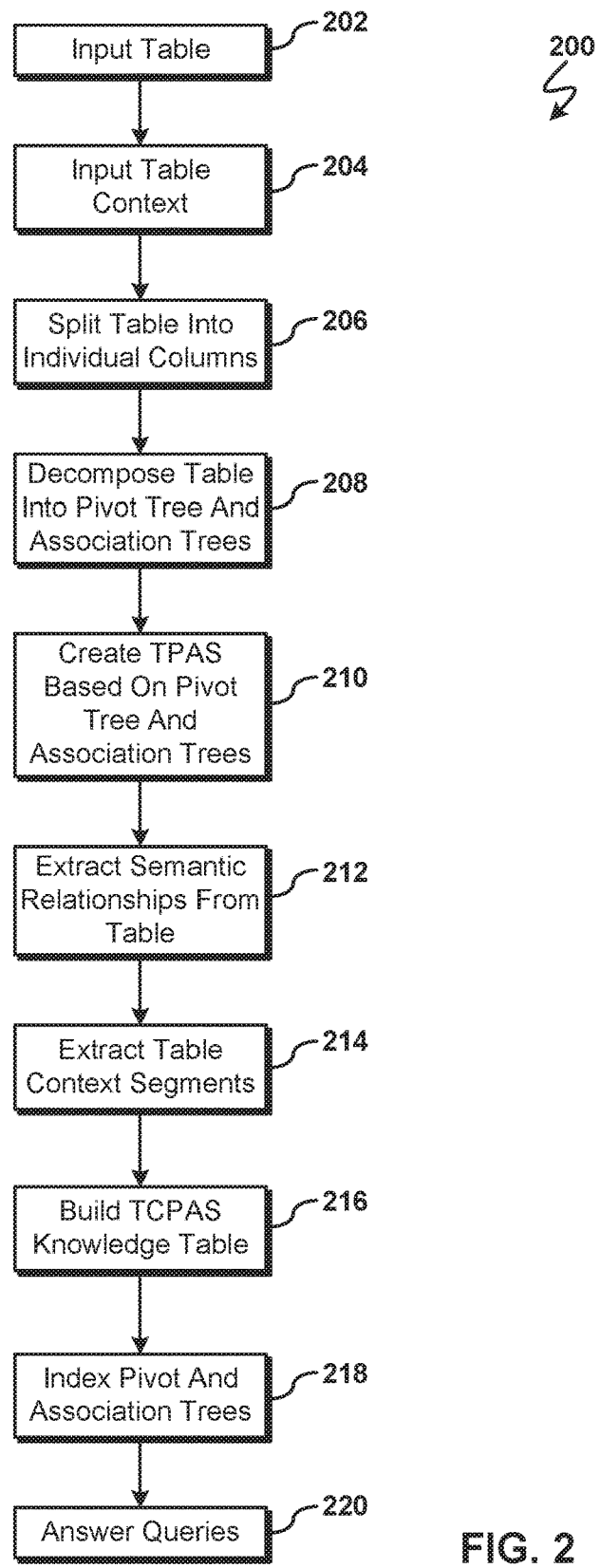
FIG. 2 is an operational flowchart illustrating a process for semantic representation according to at least one embodiment.

Referring now to FIG. 2, an operational flowchart illustrating the exemplary semantic representation process 200 by the semantic table representation program 108a and 108b (FIG. 1) according to at least one embodiment is depicted.

At 202, the semantic representation process 200 may receive an input table. According to at least one embodiment, table data from a source table may be extracted from textual sources (e.g., PDF files, HTML, etc.) before the semantic representation process 200 receives the table as input. For example, a source table having headers and cell values formatted in row/column format from a PDF document may be extracted and sent to the semantic representation process 200 having M labeled rows and N columns.

Next, at 204, contextual data associated with the source table may also be received as input. According to at least one embodiment, additional contextual data (e.g., table title, table description, footer, summary, etc.) corresponding to the source table may be received as input by the semantic representation process 200. For example, text corresponding to a table description that was contained in the source document (e.g., PDF document), and thus not represented in the headers or cell values, may also be identified, extracted, and sent to the semantic representation process 200.

Then, at 206, the source table data may be split into individual columns. According to at least one embodiment, the input table with N columns may split into N individual columns along with header information if present. For example, N column table data may be split and stored into N individual data structures, such as arrays.

At 208, the input table data may be decomposed and used to construct a pivot tree (i.e., primary tree) and one or more association trees (i.e., secondary trees). According to at least one embodiment, an input table having M rows (i=1 . . . M) and N columns (j=1 . . . N) may be used to generate a pivot tree and an association tree based on the individual columns that were split previously. The pivot tree and association tree(s) may be built using an algorithm such as a BFS tree traversal algorithm. The pivot tree may be constructed from the first base column (i.e., j=1) of the table, denoting the header value of the column. The header value may be used as the root node of the pivot tree and the remaining cell values in the first base column may be added as child nodes to the root node. Cell values under the header may be identified as leaf nodes of the pivot tree unless the cell values are category/section headers, sub-headers, footers or summary type cells.

If there are category/section headers, sub-headers, footers or summary type cells present in the input table, category header and sub-header cell values may be added as intermediate nodes to the pivot tree. In instances when there may be missing headers within the tables (e.g., the table was extracted from the source document improperly or subsequent data corruption before reaching the semantic representation process 200) a placeholder value, such as null, may be used as the root node.

From the remaining columns (i.e., columns j=2 . . . N) of the input table, an association tree may be generated for each additional column following the process described above with respect to building the pivot tree. For example, a table with 4 total columns will have a pivot tree built based on the first column (i.e., column 1). The remaining three columns may be used to build three association trees, one for each remaining column (i.e., column 2 would be association tree 1, column 3 would be association tree 2, etc.). All leaf nodes within the association trees having special symbols (e.g., "$", etc.) may be normalized by utilizing predefined mapping. For example, a U.S. dollar symbol "$" may have a predefined mapping to a string such as "dollar" based on the American Standard Code for Information (ASCII) value of "$".

A separate summary tree may also be constructed and populated with table footers and summary cells whereby the summary and footer headers may be the root node and all row values may be added as child nodes. The summary tree may be used to represent data that applies to the entire, or partial, input table and may not be related to single row or cell within the input table.

Next, at 210, the pivot tree and association trees may be used to create a table predicate argument structure (TPAS) knowledge base. According to at least one embodiment, each child-root (i.e., value of the child node appended to the value of the root node) of the pivot tree may be mapped to the root-child (i.e., value of the root node appended to the value of the child node) of the association trees using a depth first search (DFS) algorithm in a left-to-right tree traversal order to create a predicate triple (i.e., two predicate arguments and a cell value). Each child-root or root-child node combination (i.e., compound phrases) of the pivot tree may be considered the first predicate argument, while each root/intermediate node of the association tree may, in left-to-right order, be considered as the second predicate argument and the corresponding leaf-node value of the association tree may be considered as the value element of the predicate triple.

In cases when the pivot tree contains intermediate nodes (e.g., due to the input table having sub-headings), the intermediate node value may be combined with the root node value to form the first predicate argument (e.g., the root node value appended to the intermediate node value) or another first predicate argument may be formed by combining the intermediate node value with the leaf node value (e.g., the intermediate node value appended to the leaf node value) of the pivot tree. The formed first predicate argument may then be matched with the corresponding cell value in the association tree as described above by following a left-to-right order to find the second predicate argument and leaf node value to obtain the value element for the predicate triple.

The above process for forming predicate triples may be continued iteratively until all possible predicate triple combinations are found and stored in the TPAS knowledge base. The value element within the predicate triple may contain numeric values, text string values, a mixture of text and numeric values, etc. Additional predicate triples may also be formed by making copies of existing predicate triples and substituting synonymous terms in order to increase answer accuracy by increasing the likelihood that a match to the natural language query will be found in the TPAS knowledge base. The semantic representation process 200 may also compute the minimum, average, maximum, and mean values for the leaf nodes of the association trees and store those values within the TPAS knowledge base in order to answer aggregate type queries.

Then, at 212, semantic relationships within the table may be extracted. The base column of the table (i.e., column j=1) forming the basis for the pivot tree may have semantic relationships with the remaining columns that are represented by the association trees. According to at least one embodiment, semantic relationships such as IsA (hypernym, hyponym), HasA(meronym), CategoryOf, PartOf (holonym), NA (i.e., no relationship) etc. may be determined based on table header content type such as numeric, location (spatial), person, date, organization, time (temporal), and other noun phrases. Semantic relationships of known types may be identified and disambiguated using unstructured table context from the source where the tables were originally contained using a tool such as WordNet® (WordNet is a trademark or a registered trademark of Princeton University and/or its affiliates). Additionally, a table may have more than one semantic relationship present within the table.

At 214, table context segments may be extracted from the source table data. According to at least one embodiment, title, caption, noun phrases and informative sentences from the table context (i.e., data relating to the table that may not make up the table headers and cell values) may be identified. Informative sentences may be identified using keywords and noun phrases by estimating minimal overlap between the sentence and the table content metadata (e.g., header information). Minimal overlap may be measured using surface string similarity measures such as dice coefficient, jacquard similarity, or using a fuzzy string matching algorithm.

Next, at 216, a table context predicate argument structure (TCPAS) knowledge base may be built based on the extracted table context segments. According to at least one embodiment, informative sentences may be parsed and corresponding predicate arguments may be generated based on the parsed sentences. The corresponding predicate arguments may then be stored in a data repository as a TCPAS knowledge base. Title, captions and noun phrases that were extracted may be stored in a concept dictionary within the TCPAS in order to fill in missing table content information. Missing header information in the table trees and lexical ambiguities may be resolved by utilizing the TCPAS knowledge base to substitute correlated information.

Then, at 218, the pivot tree and association trees may be indexed. According to at least one embodiment, the pivot and association trees may be indexed based on the root and intermediate nodes of the trees in Extensible Markup Language (XML) format using known XML indexing techniques.

At, 220, the natural language queries may be answered. Queries may be answered by using at least one of a predicate argument structure answer technique as described in more detail below with respect to FIG. 3, or a direct tree answer technique as described in more detail below with respect to FIG. 4.

Figure 3:
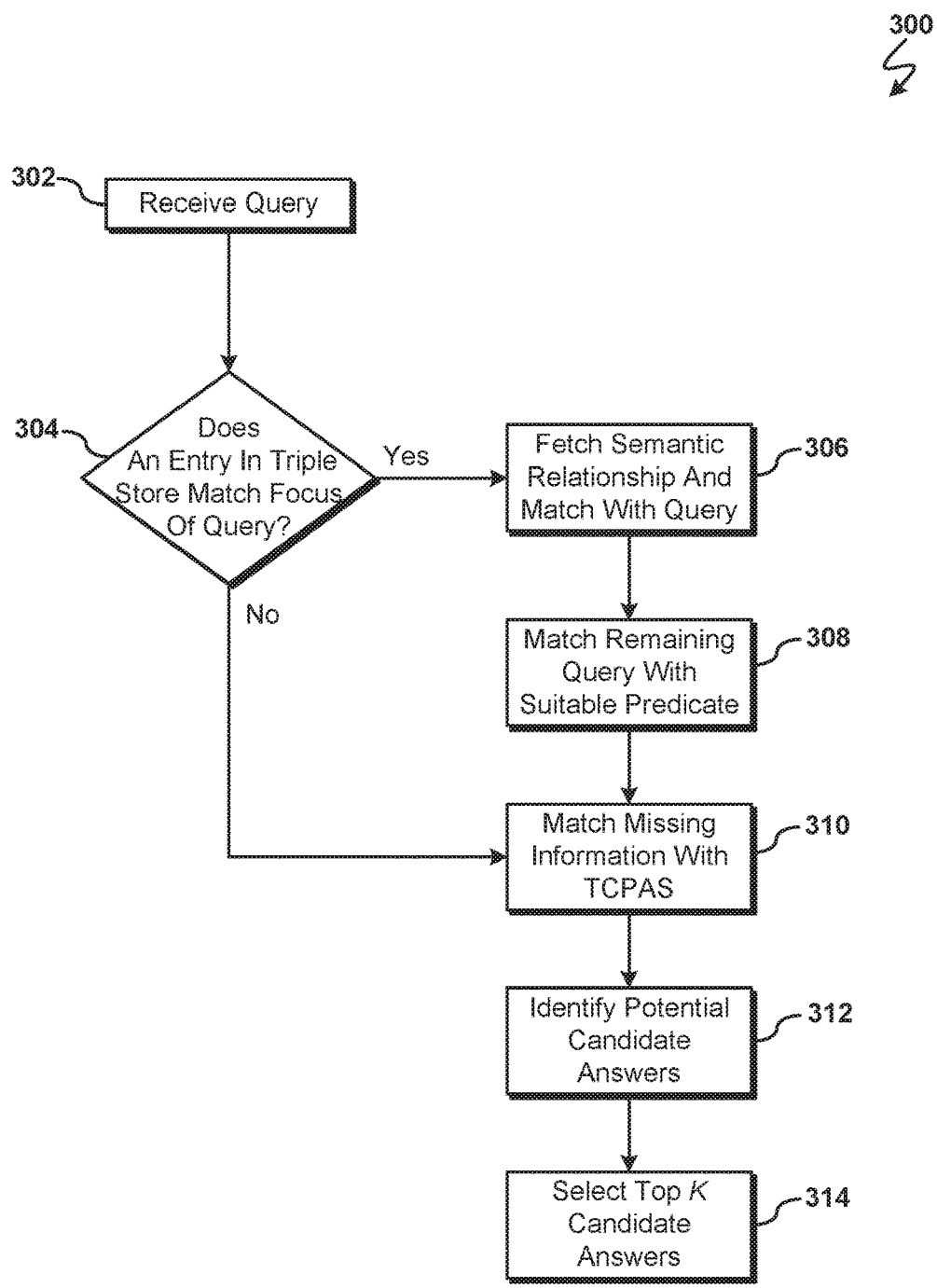
FIG. 3 is an operational flowchart illustrating a process for predicate argument answering according to at least one embodiment.

Referring now to FIG. 3, an operational flowchart illustrating the exemplary predicate argument answer process 300 according to at least one embodiment is depicted.

At 302, the predicate argument answer process 300 may receive the natural language query. According to at least one embodiment, the predicate argument answer process 300 may receive a pre-parsed natural language query with an identified focus, predicate argument and semantic relationship. For example, for input natural language query "what is the maximum entry age for Premium B?" the focus may be identified as maximum entry age, the query predicate argument may be Premium B and the query semantic relationship may be HasA.

Next, at 304, the predicate argument answer process 300 may search the predicate triple store entries stored in the TPAS and TCPAS for a predicate triple having a second predicate argument that matches the query focus. According to at least one embodiment, the query focus may be compared with predicate triples stored in the TPAS and TCPAS for a match. For example, if the query focus is maximum entry age, the predicate argument answer process 300 may search the TPAS for all predicate triples having a second predicate argument of maximum entry age. Predicate triples that have a second predicate argument matching the natural language query focus may be identified and added to a candidate answer pool. Additionally, predicate triples having arguments that may be similar to the query focus based on string similarity metrics may also be added to the candidate answer pool.

If a match between the query focus and the second predicate argument in the predicate triple was found, the corresponding semantic relation may be fetched and matched with the query at 306. According to at least one embodiment, the semantic relationship of the predicate triples found at 304 may be fetched from the TPAS/TCPAS and compared with the semantic relationship of the natural language query (e.g., HasA). Predicate triples that have semantic relationships that match the query semantic relationship may be added to the candidate answer pool as having a strong match to the query. Predicate triples having a semantic relationship that does not match the query's semantic relationship may still be viable, partially matching candidate answers that may be added to the candidate answer pool. Additional predicate triples that may not have been identified in 304 as matching the query focus, may also be searched based on the semantic relationship and added to the candidate answer pool based on having a similar semantic relationship to the input query.

At 308, the predicate argument answer process 300 may then search the predicate triples (e.g., in the TPAS or TCPAS) for a suitable predicate match for the remainder of the input query (i.e., the query's predicate argument). For example, if the query predicate argument is Premium B, the predicate argument answer process 300 may search the predicate triples for a predicate triple with a first predicate argument matching the query argument (i.e., a predicate triple having a first predicate argument of Premium B). String similarity metrics may also be used to find predicate arguments similar to the query's predicate argument. Predicate triples having matching, or similar, first predicate arguments with the query predicate argument may then be added to the candidate answer pool.

Next, at 310 any information that may be missing from predicate triples may be substituted with information from the TCPAS. According to at least one embodiment, if any predicate arguments in the predicate triples from the TPAS were missing information, the predicate argument answer process 300 may search the TCPAS for the missing information to supplement the predicate triples. Additionally, the predicate argument answer process 300 may search the TCPAS for possible candidate answers among the predicate triples stored in the TCPAS similarly to the way described above previously for searching the TPAS in response to not finding an entry in the triple store that matches the focus of the query at 304.

Then, at 312 potential candidate answers may be identified. According to at least one embodiment, the predicate argument answer process 300 search candidate answer pool for potential candidate answers. Predicate triples may be identified as potential candidate answers based on the predicate triple's total similarity to the input query (i.e., the complete predicate triple's similarity to the input query). The predicate argument answer process 300 may estimate match similarity to the input query using a known string similarity metric, with or without stemming. For example, an input query (e.g., "What is the maximum entry age for Premium B?") having a predicate argument as a first argument (e.g., Premium B=query_arg1) and a focus as a second argument (e.g., maximum entry age=query_arg2) may be received by the predicate argument answer process 300. If the first candidate answer was found in the TPAS, the candidate answer may have a first argument (e.g., TPAS_arg1), a second argument (e.g., TPAS_arg2) and a value (e.g., val). The predicate argument answer process 300 may then compare the similarity between the first query argument and the first candidate answer argument (e.g., Similarity(query_arg1, TPAS_arg1)) using a string similarity metric. The resulting similarity score may then be stored for use in computing a total similarity score. The predicate argument answer process 300 may use the same technique to determine the similarity between the second query argument and the second answer argument (e.g., Similarity(query_arg2, TPAS_arg2)). Additionally, the predicate argument answer process 300 may compare the semantic relationships of the input query and candidate answer. Based on the similarity of the two predicate arguments and semantic relationship of the input query and the candidate answer, a total similarity score may be assigned to the candidate answer. The predicate argument answer process 300 may then iteratively proceed through the remaining predicate triples within the candidate answer pool to assign a total similarity score to each predicate triple. Each candidate answer value element and ranking score may be stored as a tuple (e.g., Candidate_answer(val, score)).

At 314, the top K candidate answers may be selected from the candidate answer pool. According to at least one embodiment, once each candidate answer has been assigned a total similarity score, the candidate answers may be ranked by total similarity score.

A user or other entity may set the predefined number of candidate answers (e.g., K number of candidate answers) that may be selected from the candidate answer pool. Then, the predicate argument answer process 300 may select the top K candidate answers based on total similarity score. Candidate answers in the candidate answer pool that were not selected (i.e., not in the top K candidate answers) may be removed from the candidate answer pool resulting in a candidate answer pool containing K candidate answers.

Figure 4:
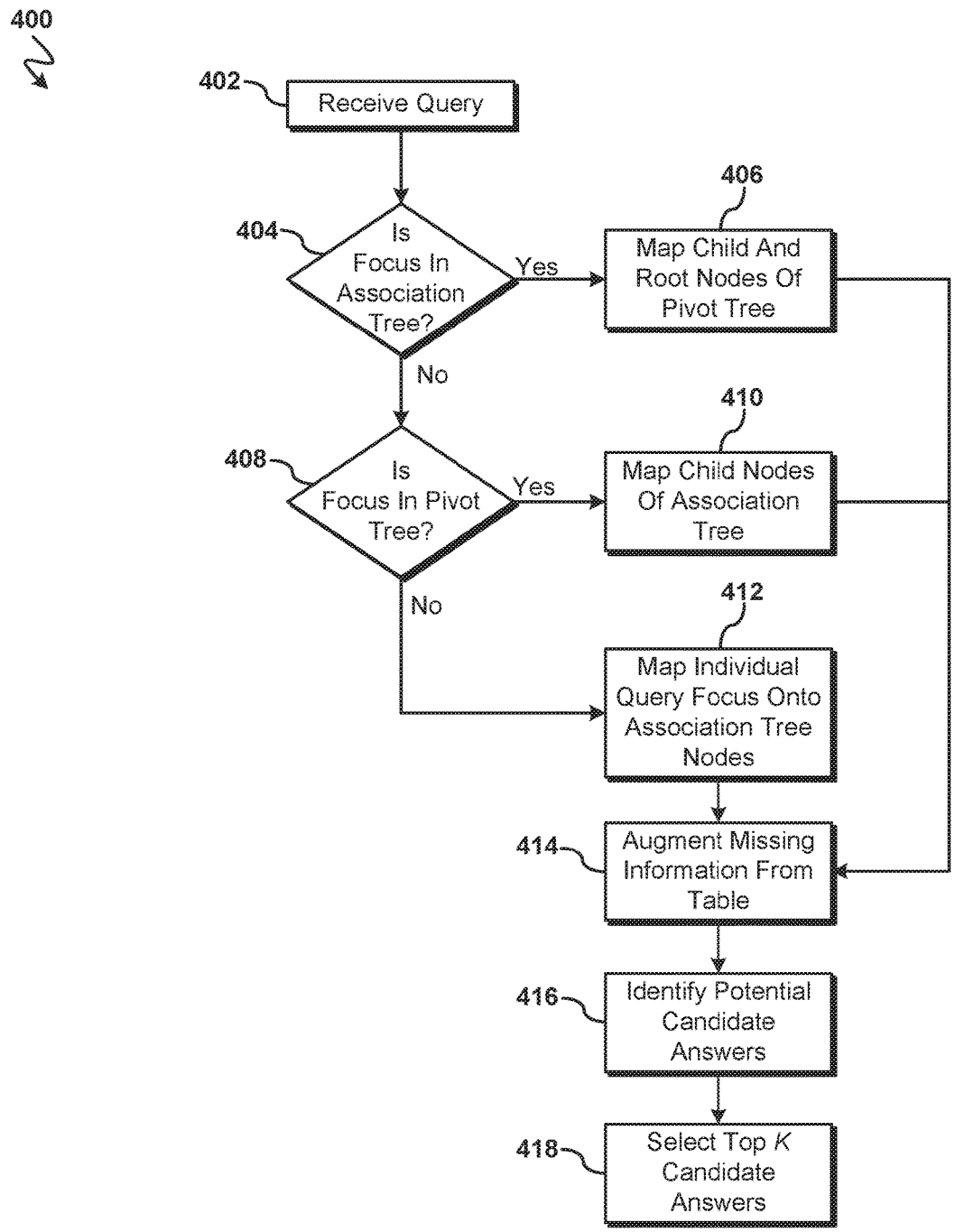
FIG. 4 is an operational flowchart illustrating a process for direct tree answering according to at least one embodiment.

Referring now to FIG. 4, an operational flowchart illustrating the exemplary direct tree answer process 400 according to at least one embodiment is depicted.

At 402, the direct tree answer process 400 may receive the natural language query may be received as input. According to at least one embodiment, the direct tree answer process 400 may receive a pre-parsed natural language query with an identified focus, predicate argument and semantic relationship. For example, for input natural language query "what is the maximum entry age for Premium B?" the focus may be identified as maximum entry age, the query predicate argument may be Premium B and the query semantic relationship may be HasA.

Next, at 404, the direct tree answer process 400 may search the association tree for a node value that matches the query focus. If a leaf node value in an association tree matches the query focus at 404, the direct tree answer process 400 may then map the child nodes and the root node of the pivot tree to the root and intermediate nodes of the association tree at 406. With the node identified in the association tree that corresponds to the input query focus, and the root (and intermediate nodes if present) in the pivot tree corresponding to the node identified in the association tree, the direct tree answer process 400 may have the predicate arguments and a cell value to form a candidate answer predicate triple.

However, if no match for the query focus was found in the association tree(s) at 404, the direct tree answer process 400 may search the pivot tree for a node value that matches the input query focus at 408. According to at least one embodiment, the direct tree answer process 400 may search the pivot tree for a node value that matches the input query focus argument. According to at least one other embodiment, the direct tree answer process 400 may search for a match to the focus in the pivot tree even if a possible match was already found in the association tree in order to build a larger candidate answer pool.

If a node value in the pivot tree is found that matches the input focus at 408, the child nodes of the association tree may then be mapped to the pivot tree nodes to obtain the corresponding leaf node value or intermediate node value to build a candidate answer at 410. According to at least one embodiment, based on finding a match to the input query focus in the pivot tree, the direct tree answer process 400 may map the matched node in the pivot tree to intermediate or leaf nodes in an association tree such that two predicate arguments and a cell value may be identified. From the identified two predicate arguments and cell value, a candidate answer may be built and added to the candidate answer pool.

However, if a match to the input query focus is not found in the pivot tree, the direct tree answer process 400 may determine that the query is a compound type of query at 412 and map individual query focuses onto the association tree root nodes to obtain corresponding leaf node values as candidate answers.

Then, at 414, any missing information from the trees that form part of the answers within the candidate answer pool may be augmented by searching through correlated context knowledge (e.g., summary, description, etc. associated with the input table). For example, if an association tree has a node that is null or missing, context knowledge associated with the table may be searched to substitute for the missing node information.

Based on the results from searching the pivot and association trees for matches to the input query focus, a candidate pool may have been built and candidate answers may be identified at 416. According to at least one embodiment, the direct tree answer process 400 may estimate match similarity to the input query using a string similarity metric, with or without stemming. For example, an input query (e.g., "What is the maximum entry age for Premium B?") having a predicate argument as a first argument (e.g., Premium B=query_arg1) and a focus as a second argument (e.g., maximum entry age=query_arg2) may be received by the direct tree answer process 400. The candidate answer may have a first argument (e.g., candidate_arg1), a second argument (e.g., candidate_arg2) and a value (e.g., val). The direct tree answer process 400 may then compare the similarity between the first query argument and the first candidate answer argument (e.g., Similarity(query_arg1, candidate_arg1)) using a string similarity metric. The resulting similarity score may then be stored for use in computing a total similarity score. The direct tree answer process 400 may use the same technique to determine the similarity between the second query argument and the second answer argument (e.g., Similarity(query_arg2, candidate_arg2)). Additionally, the direct tree answer process 400 may compare the semantic relationships of the input query and candidate answer. Based on the similarity of the two predicate arguments and semantic relationship of the input query and the candidate answer, a total similarity score may be assigned to the candidate answer. The direct tree answer process 400 may then iteratively proceed through the remaining candidate answers within the candidate answer pool to assign a total similarity score to each candidate answer. Each candidate answer value element and ranking score may be stored as a tuple (e.g., Candidate_answer(val, score)). The predicate triples within the candidate answer pool may be identified as candidate answers.

At 418, the answers within the candidate answer pool may then be ranked based on the results of the string similarity metrics and the top K candidate answers may be selected from the candidate answer pool. According to at least one embodiment, once each candidate answer has been assigned a total similarity score, the candidate answers may then be ranked by total similarity score.

A user or other entity may set the predefined number of candidate answers (e.g., K number of candidate answers) that may be selected from the pool of candidate answers. Then, the direct tree answer process 400 may select the top K candidate answers based on total similarity score. Predicate triples within the candidate answer pool not in the top K candidate answers may be removed, leaving the top K candidate answers as the answer pool.

Figure 5:
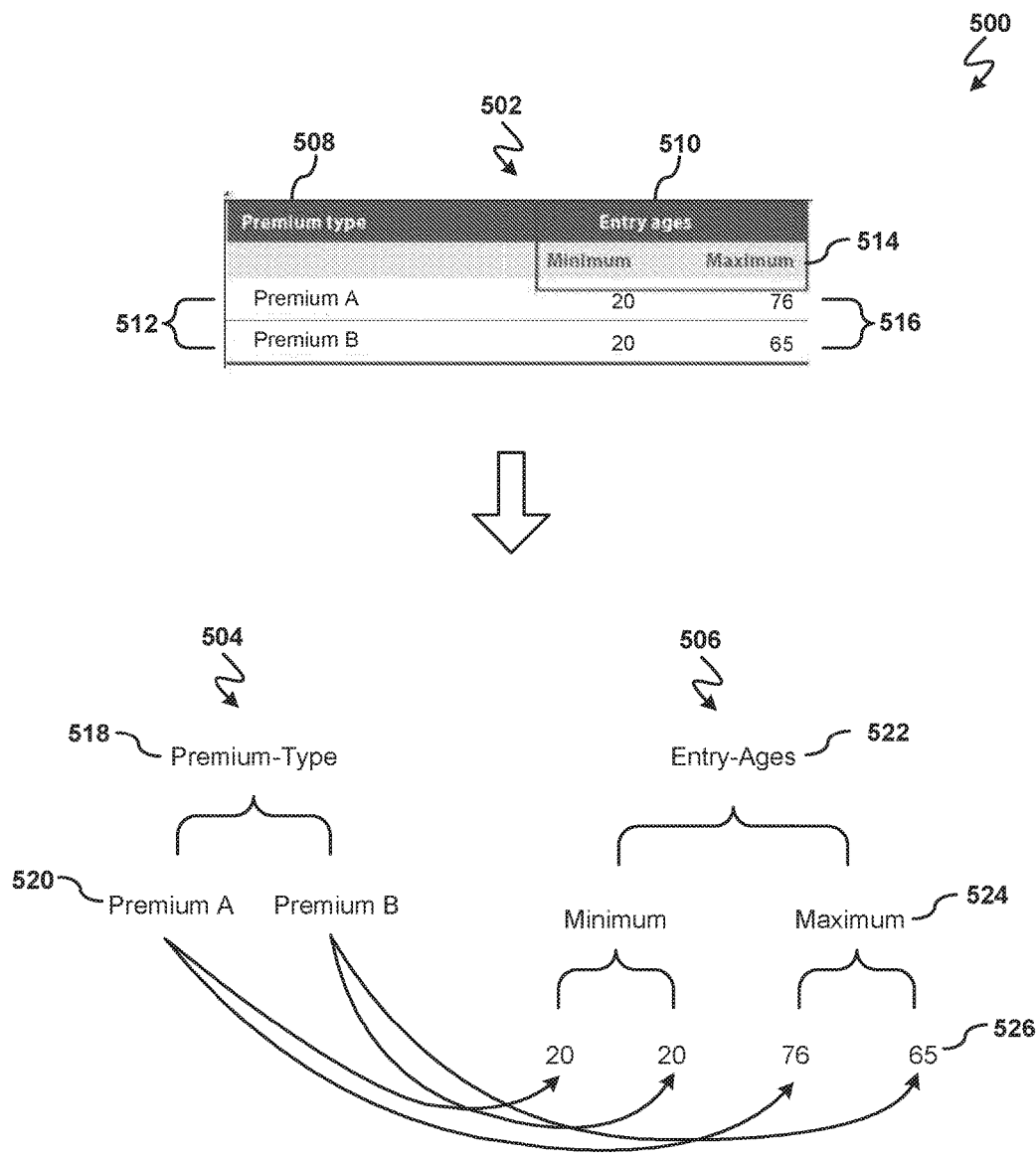
FIG. 5 illustrates an exemplary semantic table representation scenario according to at least one embodiment.

Referring now to FIG. 5, an example semantic table representation scenario 500 illustrating a semi-structured table 502 decomposed into a pivot tree 504 and an association tree 506 is depicted. In the semantic table representation scenario 500, an input semi-structured table 502 has been extracted from a source document (e.g., PDF document). The semi-structured table 502 has a first column 508 and a second column 510. The first column 508 has the string value "Premium type" as the heading value. The remaining first column cell values 512 include the string values "Premium A" and "Premium B". The second column 510 has the string value "Entry ages" as the heading value. The second column 510 also includes two sub-headings 514 with the string values of "Minimum" and "Maximum". The second column cell values 516 at the intersection of "Premium type—Premium A" and "Entry ages—Minimum" is 20, at the intersection of "Premium type—Premium A" and "Entry ages—Maximum" is 76, at the intersection of "Premium type—Premium B" and "Entry ages—Minimum" is 20, and at the intersection of "Premium type—Premium B" and "Entry ages—Maximum" is 65.

As described previously in regards to the semantic representation process 200 (FIG. 2) at 206 (FIG. 2) and 208 (FIG. 2), the input semi-structured table's 502 columns may be individually split (i.e., the first column 508 split from the second column 510) and then the column data is used to form a pivot tree 504 based on the first column 508 and an association tree 506 based on the second column 510. Any additional columns, if present, may be used to form additional association trees.

The pivot tree's 504 pivot root node 518 would have the value of the first column header (i.e., Premium type). Pivot child nodes 520 may then be added to the pivot tree 504 using the first column cell values 512 based on a breadth first search (BFS) tree traversal algorithm. In the illustrated example, pivot child nodes 520 added to the pivot root node 518 of the pivot tree 504 include a child node with the value of Premium A and a child node with the value Premium B. The data contained in the second column 510 is then used to generate association tree 506. The association tree root node 522 is given the value of the second column's 510 header, Entry ages. Additional association tree 506 nodes are then added according to the BFS tree traversal algorithm. Association tree intermediate nodes 524 are added based on the second column's 510 sub-headers 514. Thus, intermediate nodes 524 having the value of Minimum and the value of Maximum are added as children of the association tree root node 522. Next, association tree leaf nodes 526 are added to the association tree 506 as children of the intermediate nodes 524. Two leaf nodes 526 are created as children of the intermediate node 524 Minimum, each leaf node 526 having the value of 20. Two leaf nodes 526 are also added as children to the intermediate node 524 Maximum, having the values of 76 and 65 in left-to-right order.

After building the pivot tree 504 and association tree 506, the semantic representation process 200 (FIG. 2) maps the pivot tree 504 to the association tree 506 using a depth first search (DFS) tree traversal algorithm in a left-to-right order. In the process of mapping, the semantic representation process 200 (FIG. 2) creates predicate triples. The predicate triples (i.e., semantic relationship(first predicate argument, second predicate argument, cell value)) created from the illustrated semantic table representation scenario 500, would include the semantic relationship of the table, the pivot root node 518 value appended to the end of the pivot child node 520 value to form the first predicate argument, the association tree root node 522 value appended to the end of the association tree intermediate node 524 value to from the second predicate argument, and an association tree leaf node 526 value as the cell value. If the table semantic relationship is HasA, the predicate triples formed would include HasA (Premium A-premium type, Minimum-entry ages, 20); HasA(Premium B-premium type, Minimum-entry ages, 20); HasA(Premium A-premium type, Maximum-entry ages, 76); and HasA(Premium B-premium type, Maximum-entry ages, 65). The predicate triples that are formed are then stored into a database containing the table predicate argument structure (TPAS) for use in finding an answer to a natural language query.

If a natural language query "What is the maximum entry age for premium B?" is made, the query may be parsed and the focus and query predicate argument may be identified before being sent to the semantic representation process 200 (FIG. 2) along with the query's semantic relationship. The focus for the above query would be maximum entry age and the predicate argument for the above query would be Premium B. The query's semantic relationship, HasA, would also be sent. Having built the TPAS with predicate triples and having received data relating to the query (e.g., the query, query semantic relationship, focus and query predicate argument), the semantic representation process 200 (FIG. 2) may then search the TPAS for predicate triples matching the query focus, query predicate argument and query semantic relationship. The TPAS predicate triples and query data may be compared using string similarity metrics. According to the semantic table representation scenario 500 described above, the semantic representation process 200 (FIG. 2) using the predicate argument answer process 300 (FIG. 3) may select the last predicate triple (i.e., HasA (Premium B-premium type, Maximum-entry ages, 65)) as a potential answer candidate based on the similarity between the query data and the data contained in the predicate triple.

It may be appreciated that FIGS. 2, 3, 4, and 5 provide only an illustration of a few embodiments and does not imply any limitations with regard to how different embodiments may be implemented. Many modifications to the depicted embodiment(s) may be made based on design and implementation requirements.

Figure 6:
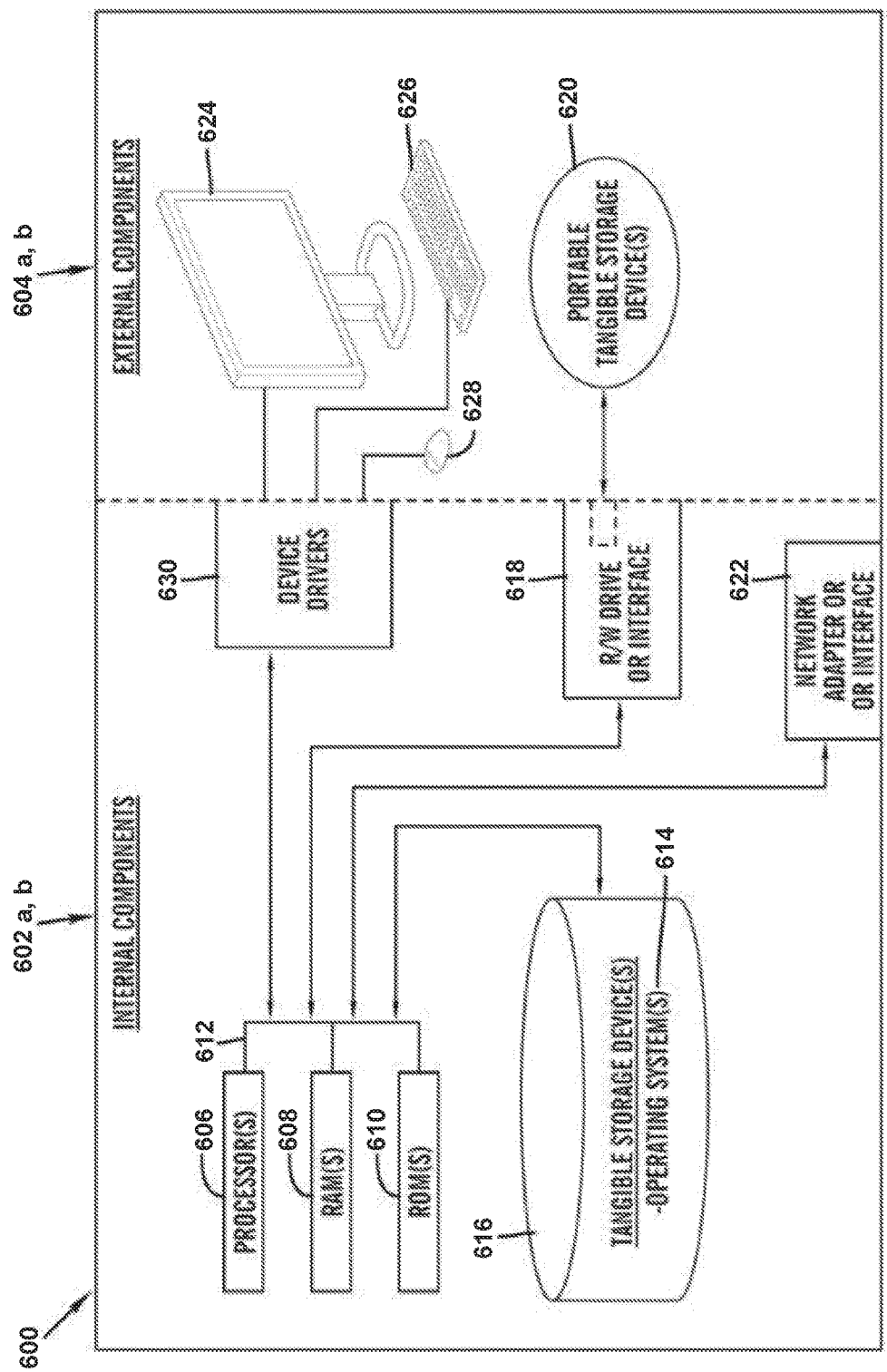
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602, 604 is representative of any electronic device capable of executing machine-readable program instructions. Data processing system 602, 604 may be representative of a smart phone, a computer system, PDA, or other electronic devices. Examples of computing systems, environments, and/or configurations that may represented by data processing system 602, 604 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 602a, b and external components 604a, b illustrated in FIG. 6. Each of the sets of internal components 602a, b includes one or more processors 606, one or more computer-readable RAMs 608 and one or more computer-readable ROMs 610 on one or more buses 612, and one or more operating systems 614 and one or more computer-readable tangible storage devices 616. The one or more operating systems 614 and programs such as a semantic table representation program 108a and 108b (FIG. 1), may be stored on one or more computer-readable tangible storage devices 616 for execution by one or more processors 606 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory or any other computer-readable tangible storage device that can store a computer program and digital information.

Each set of internal components 602a, b also includes a R/W drive or interface 618 to read from and write to one or more portable computer-readable tangible storage devices 620 such as a CD-ROM, DVD, memory stick, magnetic tape, magnetic disk, optical disk or semiconductor storage device. The semantic table representation program 108a and 108b (FIG. 1) can be stored on one or more of the respective portable computer-readable tangible storage devices 620, read via the respective R/W drive or interface 618 and loaded into the respective hard drive 616.

Each set of internal components 602a, b may also include network adapters (or switch port cards) or interfaces 622 such as a TCP/IP adapter cards, wireless wi-fi interface cards, or 3G or 4G wireless interface cards or other wired or wireless communication links. The semantic table representation program 108a (FIG. 1) in client computer 102 (FIG. 1) and the semantic table representation program 108b (FIG. 1) in network server computer 110 (FIG. 1) can be downloaded from an external computer (e.g., server) via a network (for example, the Internet, a local area network or other, wide area network) and respective network adapters or interfaces 622. From the network adapters (or switch port adaptors) or interfaces 622, the semantic table representation program 108a (FIG. 1) in client computer 102 (FIG. 1) and the semantic table representation program 108b (FIG. 1) in network server computer 110 (FIG. 1) are loaded into the respective hard drive 616. The network may comprise copper wires, optical fibers, wireless transmission, routers, firewalls, switches, gateway computers and/or edge servers.

Each of the sets of external components 604a, b can include a computer display monitor 624, a keyboard 626, and a computer mouse 628. External components 604a, b can also include touch screens, virtual keyboards, touch pads, pointing devices, and other human interface devices. Each of the sets of internal components 602a, b also includes device drivers 630 to interface to computer display monitor 624, keyboard 626 and computer mouse 628. The device drivers 630, R/W drive or interface 618 and network adapter or interface 622 comprise hardware and software (stored in storage device 616 and/or ROM 610).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
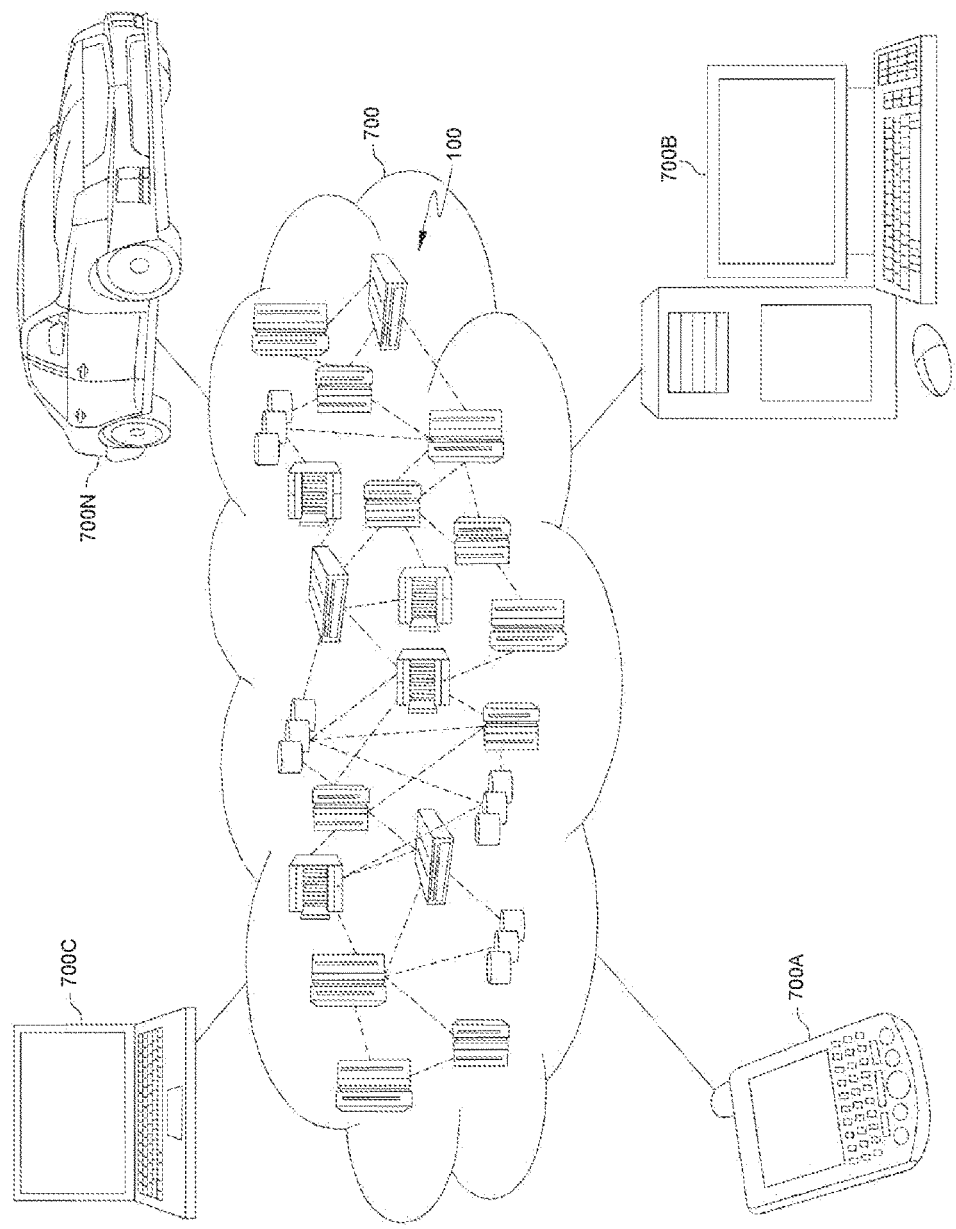
FIG. 7 is a block diagram of an illustrative cloud computing environment including the computer system depicted in FIG. 1, in accordance with an embodiment of the present disclosure.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
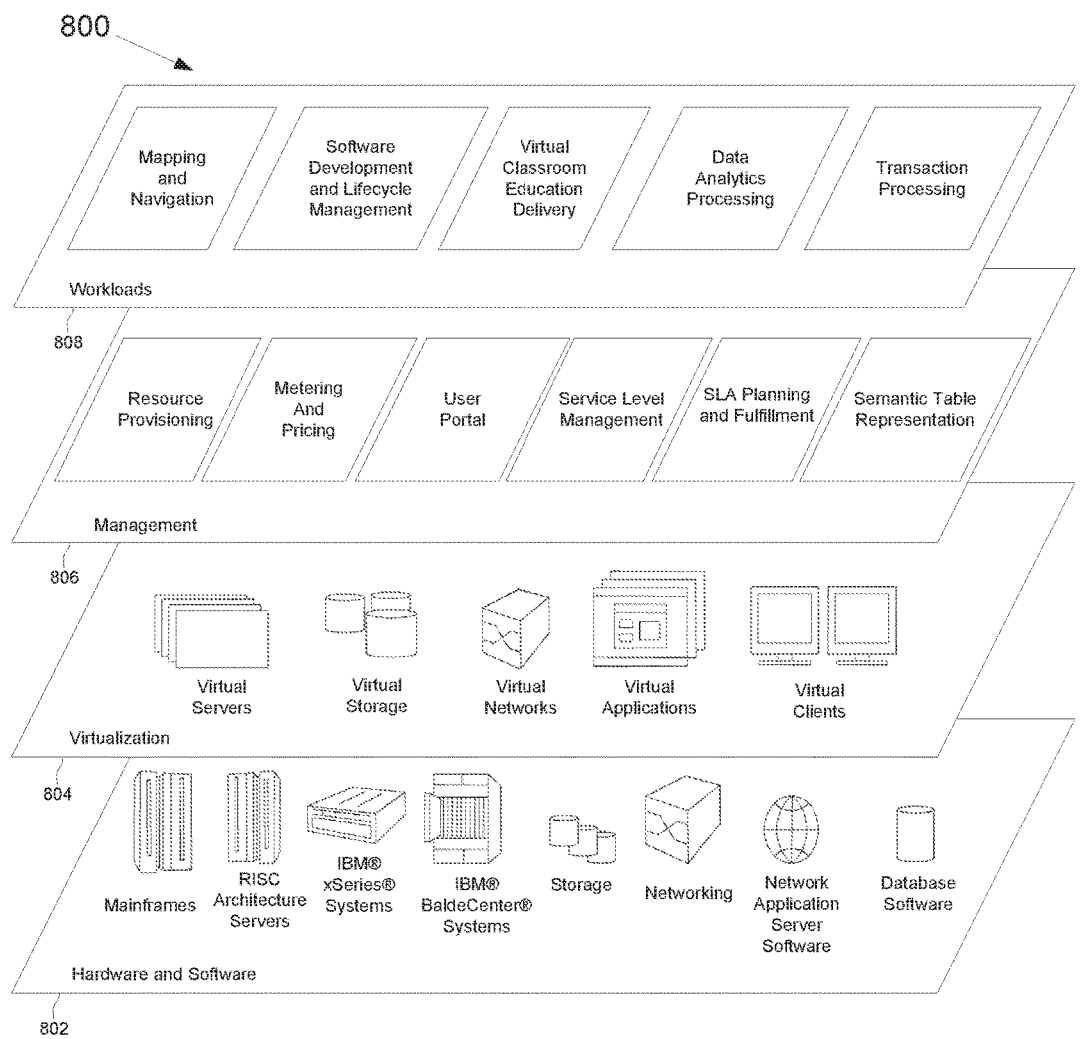
FIG. 8 is a block diagram of functional layers of the illustrative cloud computing environment of FIG. 7, in accordance with an embodiment of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes; RISC (Reduced Instruction Set Computer) architecture based servers; storage devices; networks and networking components. In some embodiments, software components include network application server software.

Virtualization layer 804 provides an abstraction layer from which the following examples of virtual entities may be provided: virtual servers; virtual storage; virtual networks, including virtual private networks; virtual applications and operating systems; and virtual clients.

In one example, management layer 806 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Semantic table representation provides for decomposing input tables into tree structures that preserve semantic relationships and answers natural language queries.

Workloads layer 808 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for finding an answer to a query from a table, the method comprising:
receiving the query and the table, wherein the table is derived from a source document containing the table and a plurality of peripheral context data;
receiving a focus associated with the received query;
receiving the plurality of peripheral context data associated with the table, wherein the received plurality of peripheral context data includes data distinct from the table, and wherein the received plurality of peripheral context data is derived from the source document;
generating a primary tree and a secondary tree based on the received table, wherein the primary tree corresponds with a first column of the received table, and wherein the secondary tree corresponds with a second column of the received table, wherein a primary root node of the primary tree corresponds with a first header value of the first column, wherein a secondary root node of the secondary tree corresponds with a second header value of the second column, wherein a plurality of primary child nodes of the primary tree correspond with a plurality of first column cell values, and wherein a plurality of secondary child nodes of the secondary tree correspond with a plurality of second column cell values, and wherein missing header values are represented by a placeholder value;
generating a hierarchical representation based on the generated primary tree and the generated secondary tree;
mapping the primary tree to the secondary tree;
determining that the primary tree or the secondary tree contains a missing value based on identifying the placeholder value in the primary tree or secondary tree;
determining that the plurality of peripheral context data contains a substitute value based on determining that the primary tree or the secondary tree contains the missing value;
inserting the substitute value from the plurality of peripheral context data in place of the missing value;
determining the received focus is not in the primary tree and secondary tree;
mapping the received focus onto the secondary tree based on determining the received focus is not in the primary tree and secondary tree;
generating a plurality of predicate triples based on the primary tree and the secondary tree;
determining if a predicate triple within the plurality of predicate triples matches the query; and
adding the predicate triple within the plurality of predicate triples to a plurality of candidate answers based on determining that the predicate triple matches the query.

2. The method of claim 1, wherein generating the primary tree and the secondary tree comprises using a breadth first search (BFS) algorithm.

3. The method of claim 1, wherein determining if the predicate triple within the plurality of predicate triples matches the query comprises using a string similarity metric.

4. The method of claim 1, wherein the primary tree is a pivot tree and the secondary tree is an association tree.

5. The method of claim 1, wherein mapping the primary tree to the secondary tree comprises using a depth first search (DFS) algorithm in left-to-right order.

6. The method of claim 1, wherein the table comprises a first column and a second column and wherein the primary tree is based on the first column and the secondary tree is based on the second column.

7. The method of claim 1, wherein determining if the predicate triple matches the query comprises using at least one of a plurality of table context data, a plurality of named entities, or a plurality of semantic relationships.

* * * * *